Feb. 10, 1942.  L. K. SWART  2,272,731
ELECTRIC WAVE SYSTEM
Filed Oct. 5, 1940  4 Sheets-Sheet 1

INVENTOR
L. K. SWART
BY
Robert J. Fluskey
ATTORNEY

Feb. 10, 1942.  L. K. SWART  2,272,731
ELECTRIC WAVE SYSTEM
Filed Oct. 5, 1940   4 Sheets-Sheet 2

INVENTOR
L. K. SWART
BY
Robert J Pluskey
ATTORNEY

Feb. 10, 1942. L. K. SWART 2,272,731
ELECTRIC WAVE SYSTEM
Filed Oct. 5, 1940 4 Sheets-Sheet 3

INVENTOR
L. K. SWART
BY
Robert J. Pluskey
ATTORNEY

Feb. 10, 1942.    L. K. SWART    2,272,731
ELECTRIC WAVE SYSTEM
Filed Oct. 5, 1940    4 Sheets-Sheet 4

INVENTOR
L. K. SWART
BY
Robert J. Fluskey
ATTORNEY

Patented Feb. 10, 1942

2,272,731

UNITED STATES PATENT OFFICE 2,272,731

ELECTRIC WAVE SYSTEM

Leland K. Swart, Mountain Lakes, N. J., assignor to Bell Telephone Laboratories, Incorporated, New York, N. Y., a corporation of New York Application October 5, 1940, Serial No. 359,879

5 Claims. (Cl. 179—2.5)

This invention relates to electric wave transmission systems and, more particularly, to method and means for coupling a carrier frequency telephone station or circuit to a power line in a power line carrier frequency telephone system.

Carrier or high frequency telephony on power lines is well known. Various expedients, also, have been proposed for coupling a carrier frequency telephone station to the power line. These include the use of condensers; of one or more aerials or conductors in proximity to the power line; and of the power distribution transformer coupling the power line to tributary or distribution lines. The condensers must be of large capacity, of necessity are structurally large and mechanically strong, and, consequently, quite expensive. The aerial must be long, somewhat elaborate for best results, be supported in close proximity to the power line, and presents considerable hazard to the telephone subscriber because of such proximity in the event that it should break. Couplings using the distribution transformer have not been too efficient with respect to the carrier frequency. If telephone service is to be provided readily and inexpensively in sparsely settled regions through which power lines extend, it is highly desirable that all components of the system be kept to a minimum in cost, and that the power line equipment be used to the extent possible for telephonic purposes.

An object of the invention is to make available a simple and inexpensive arrangement and method for coupling a carrier frequency telephone circuit or station to a power line in a power line telephone system, through a power distribution transformer coupled to the power line.

This object is realized, in accordance with the invention, by utilizing the distributed capacitances between the windings, core and case of the power distribution transformer, and associating inductance reactance with the transformer to tune one or some of these capacitances to the carrier or high frequency wave or waves on which telephonic communication takes place.

Still other objects and the features of the invention will be evidenced by the detailed description that follows, taken in conjunction with the appended drawings wherein.

Figure 10:
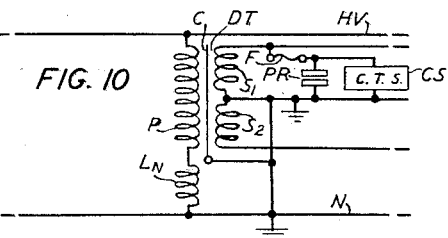
Figure 11:
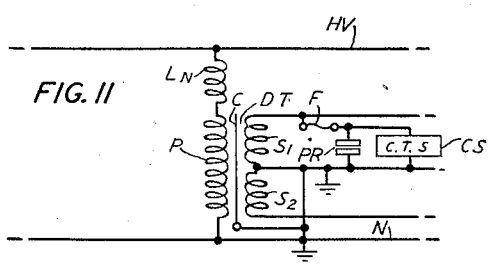
Figure 12:
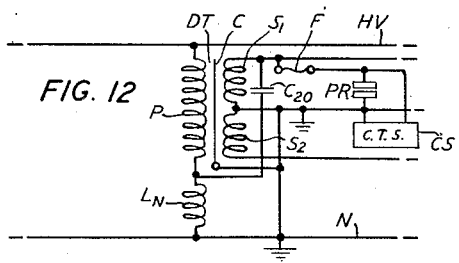
Figure 13:
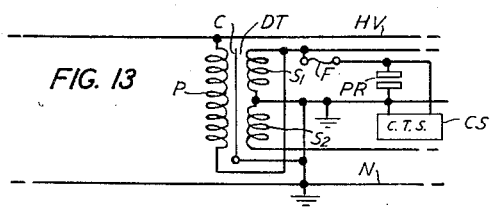
Figure 14:
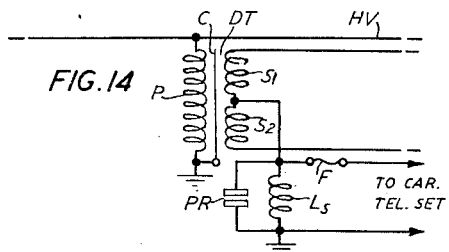
Figure 15:
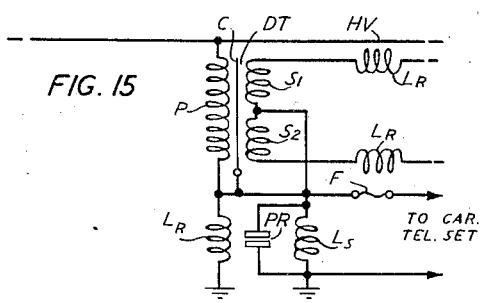
Figure 16:
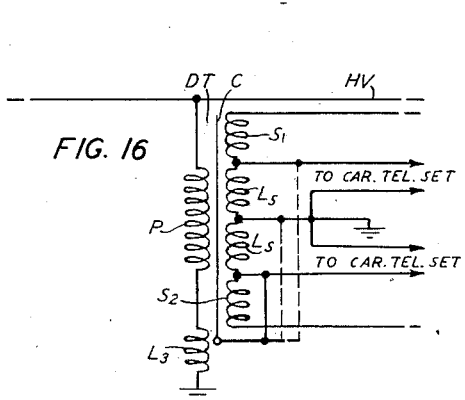
Figure 17:
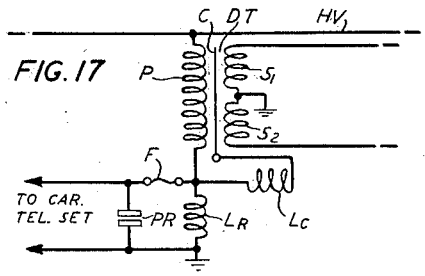
Figure 18:
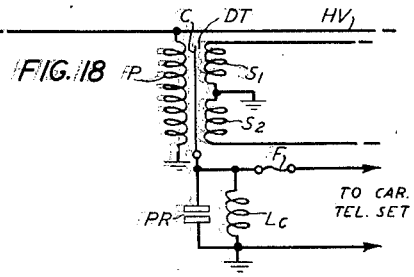
Figure 19:
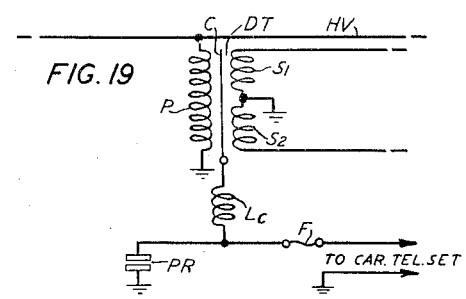
Figure 20:
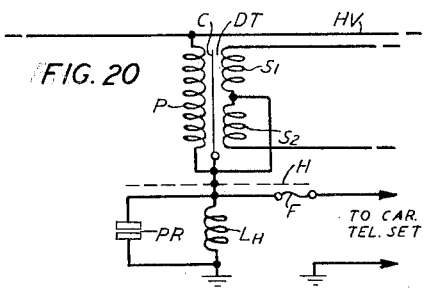
Figure 21:
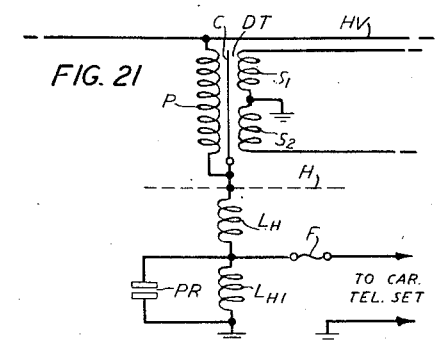
Figure 22:
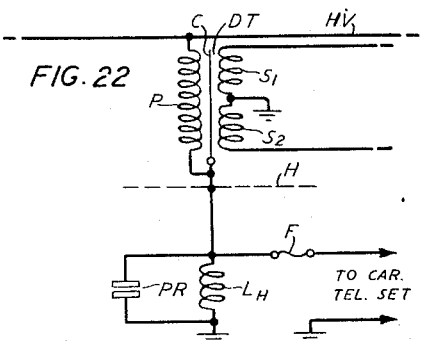
Figure 23:
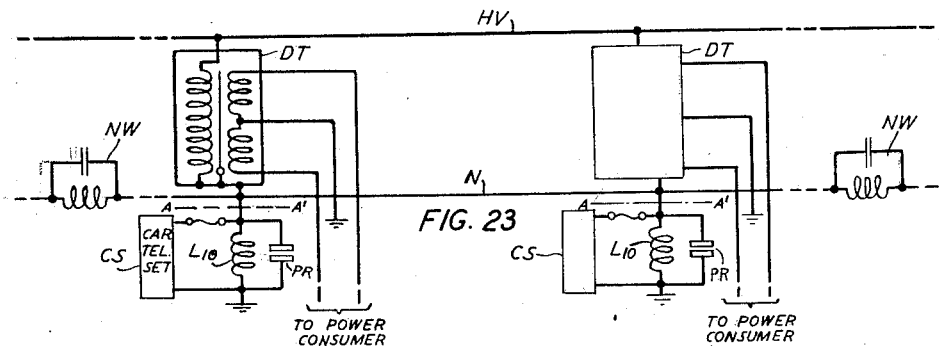
Figures 24, 25:
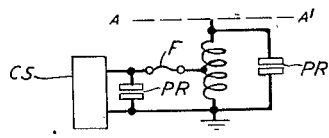
Figure 26:
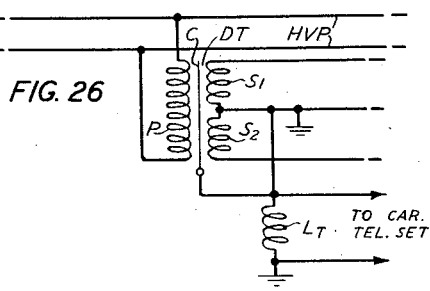
Figure 27:
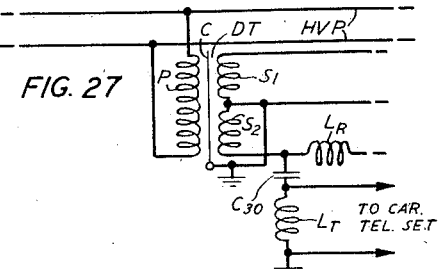
Figure 28:
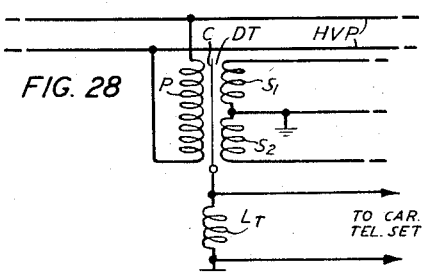
Figure 29:
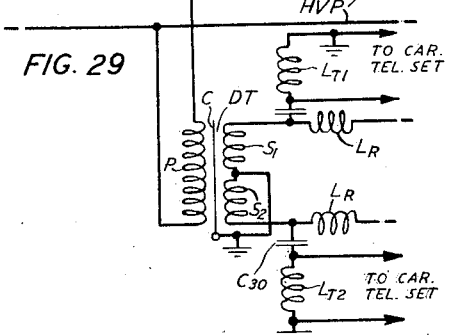

Figs. 10, 11, 12 and 13 show circuit arrangements for transmitting the carrier frequency waves as well as the low frequency power through the power transformer, tuning inductances being connected in series with the transformer primary winding in Figs. 10 and 11, and the primary winding being connected to the secondary winding in Figs. 12 and 13;

Fig. 14 shows the tuning inductance connected on the secondary winding side of the transformer, with the primary winding and the core connected;

Fig. 15 shows the tuning inductance connected in series with the transformer windings and core;

Fig. 16 shows the transformer core connected to the secondary winding, and a pair of tuning inductances in series with the sections of that winding;

Fig. 17 shows the tuning inductance connected between the transformer core and the low potential end of the primary winding, isolated from ground by a radio frequency choke coil;

Figs. 18 and 19 show the transformer core isolated from ground by the tuning inductance, the carrier set being connected in parallel with the inductance in Fig. 18 and in series in Fig. 19;

Figs. 20, 21 and 22 illustrate how one or more of the windings, the core and the case of the transformer may be isolated from ground by the tuning inductance;

Fig. 23 illustrates how the neutral wire or conductor of a power system may be used for carrier frequency telephonic transmission, the neutral wire being connected to ground through an inductance across which the carrier receiving and transmitting set is connected;

Figs. 24 and 25 illustrate the use of a transformer and autotransformer, respectively, as a carrier set coupling element, in place of the inductance of Fig. 23;

Fig. 26 illustrates how the power distribution transformer, when connected across a pair of high voltage conductors or phase wires, may be associated with a tuning inductance to provide a tuned coupling circuit for the carrier set; and Figs. 27, 28 and 29 show modifications of the arrangement of Fig. 26, with the tuning inductance or inductances connected to different portions of the transformer.

The electric power distribution systems for rural areas are usually on a low frequency alternating current basis, either one, two or three phase. The power line may comprise two or more conductors, and, in a three-phase system, would comprise at least three wires or conductors and a neutral wire. The consumer derives his power over a tributary or distribution line through a transformer coupling it to two phase wires, or to a phase wire and the neutral.

Figure 1:
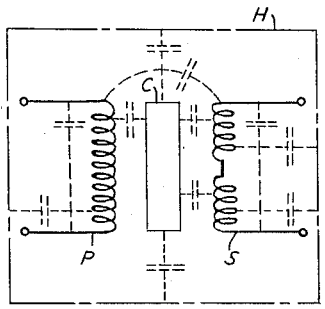
Fig. 1 is a schematic of a typical power distribution transformer with the more prominent capacitances thereof indicated.

The distribution transformer as shown in schematic in Fig. 1, usually comprises a metallic case or housing H, a magnetic core C, a primary winding P, and a secondary winding S. Although there does not appear to be any standard voltage for the power line, consumer's line voltage is generally 110 volts. The secondary winding may comprise a single winding across which such voltage would be developed, or, as shown in Fig. 1, may comprise two sections, $S_1$, $S_2$ with their junction or common terminal adapted to be connected to ground, or to a ground wire extending into the consumer's premises, 110 volts being developed across each secondary section.

There are many effective capacitances present in such a transformer. The most prominent are those existing between the primary winding and the case, the secondary winding and the case, and the core and the case; between the primary winding and the core and the secondary winding and the core; and between the primary and the secondary winding; and involving the primary and the secondary windings. Although these are distributed capacitances, for clarity of showing, they are indicated, in Fig. 1 by the conventional symbol, as lumped capacities.

One or more of these capacitances are utilized in combination with a suitably proportionate inductance or inductances to define a tuned circuit or circuits for coupling the power line and a carrier telephone set or circuit, at the carrier or high frequency or frequencies used for telephony over the power line.

Figure 2:
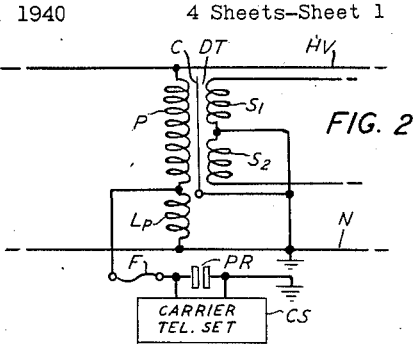
Fig. 2 shows a part of a power line carrier frequency telephone system, illustrating how an inductive impedance may be associated with the transformer of Fig. 1 and a power line, to provide a tuned coupling circuit for the telephone set or station.
Figure 3:
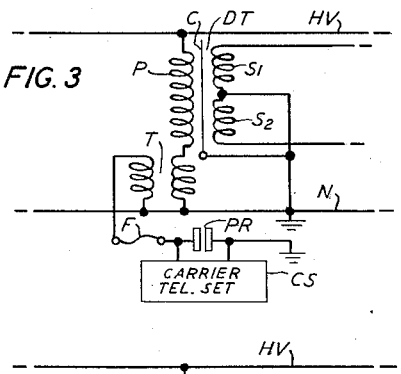
Fig. 3 is similar to Fig. 2, except that a transformer replaces the inductance connected in series with the transformer primary winding.
Figure 4:
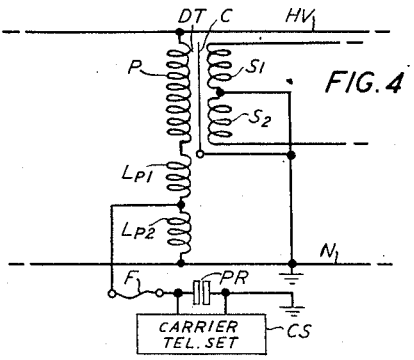
Fig. 4 shows the carrier set connected in series with the tuning inductance, and in parallel with a power frequency by-passing coil.
Figure 5:
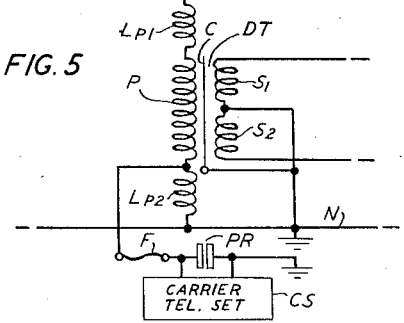
Fig. 5 is similar to Fig. 4, except that the tuning inductance is connected between the high voltage line and the high potential end of the transformer primary.

Fig. 2 illustrates an embodiment of the invention. The primary winding P of the distribution transformer DT is connected between a high voltage wire HV and the neutral wire N, with an inductance $L_P$ connected between the primary windings low potential terminal and the neutral wire. The inductance $L_P$ and the primary distributed capacitance constitute a network tuned to the carrier frequency wave that the power line is adapted to transmit for telephonic purposes. The telephone subscriber's carrier frequency transmitting and receiving set or equipment CS is connected across the inductance, a suitable fuse F and protector PR being provided to protect the carrier set and the subscriber against the hazards of high current and voltage arising in the power line. Where a reduction or increase in impedance is required, a transformer T may replace the inductance $L_P$, as illustrated in Fig. 3. Of course, an autotransformer could be employed. The arrangement of Fig. 4 operates on the same principle, but the carrier set is connected in series with the tuning inductance $L_{P1}$. An additional inductance $L_{P2}$ is provided to by-pass the low power frequency current around the carrier frequency equipment. With the arrangement of Fig. 5, the inductance $L_{P1}$ is connected between the high voltage line and the high potential terminal of the primary winding P, the inductance $L_{P2}$ being provided as in Fig. 4.

Figure 6:
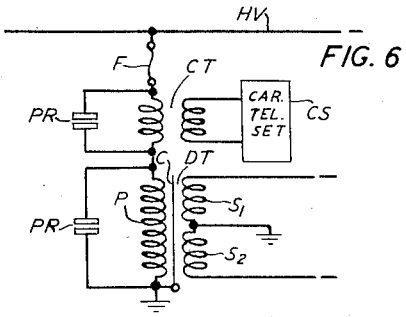
Fig. 6 shows a separate transformer for the carrier set, the primary windings of the two transformers being connected in series.

A separate carrier frequency transformer CT may be inserted, as shown in Fig. 6, between the high voltage line and the transformer primary. The primary and secondary windings of the carrier transformer should have sufficient insulation to withstand the high voltage, the carrier set being connected across the secondary winding of the transformer CT. With this arrangement, all of the effective capacitances indicated in Fig. 1 define a tuned circuit with the carrier transformer.

Figure 7:
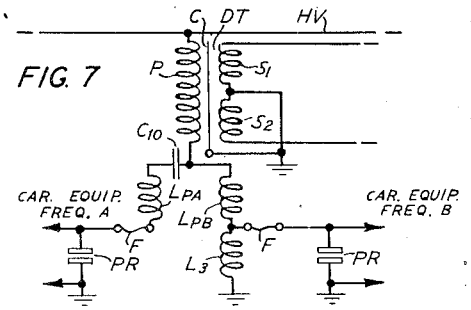
Figs. 7, 8 and 9 show circuit arrangements including a pair of inductances to tune transformer capacitances to a pair of carrier frequency waves.
Figure 8:
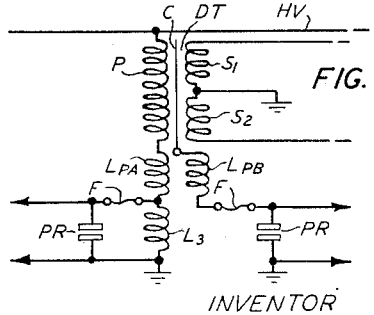
Figure 9:
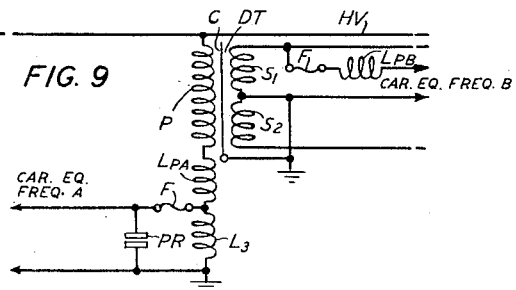

Figs. 7, 8 and 9 show arrangements to utilize one or more of the transformer capacitances in association with two inductances $L_{PA}$ and $L_{PB}$ to provide a pair of circuits tuned to two carrier or high frequencies A, B. In Fig. 7, inductances $L_{PA}$ and $L_{PB}$ with the distributed capacitance of winding P are resonant to frequencies A and B, respectively, inductance $L_3$ by-passes the low power frequency, and condenser $C_{10}$ passes frequency A, but offers high impedance to frequency B. In Fig. 8, inductance $L_{PA}$ is connected in series with the primary winding distributed capacitance; while inductance $L_{PB}$ is associated with the transformer capacitances between the primary and secondary windings and between the transformer windings and the core. In Fig. 9, the second carrier frequency B is transmitted through the distribution transformer, the carrier set for frequency A being coupled to the power line through the inductance $L_{PA}$ and the distributed capacitance of winding P. The tuned circuit for the carrier frequency B is provided by the effective capacitance between the primary and secondary windings, and the inductance $L_{PB}$.

Transmission through the power transformer, of course, may be obtained for certain frequencies without modification of the transformer. Considerably improved transmission results, however, if the primary and secondary winding reactances are neutralized. This may be accomplished, as shown in Figs. 10 and 11, by inserting an inductance $L_N$ at either the high potential or the low potential end of the primary winding, and terminating a secondary winding section $S_1$ with the carrier telephone set, the impedance of which would be the conjugate impedance looking into the secondary at the carrier frequency being employed. In the arrangement of Fig. 10, the effective capacitance between primary and secondary windings is utilized, and in Fig. 11, that effective capacitance and, in addition, the distributed capacitance of the primary winding.

Another arrangement is shown in Fig. 12, which, from the low power frequency standpoint, differs little from the transformer connection described with reference to Figs. 10 and 11, but, which, for the carrier frequency, gives effectively an autotransformer connection. The tuned circuit comprises the primary winding distributed capacitance and the capacitance between the primary and secondary windings together with the inductance of the secondary winding, the low potential end of the primary winding and the high potential end of the secondary being connected through a large condenser $C_{20}$. At the carrier frequency, the low potential end of the primary winding is effectively raised to a high impedance above ground by the inductance $L_N$. Fig. 13 shows an autotransformer arrangement wherein the primary distributed capacitance, the effective capacitance between primary and secondary windings and the inductance of one section $S_1$ of the secondary winding are tuned to the carrier frequency. The carrier set bridges the secondary winding, its impedance being high to the power frequency, and low to the carrier frequency.

By isolating the core and/or one or more of the transformer windings from ground, additional effective capacitances may be utilized in the network tuned to the carrier frequency, as compared to the arrangement in which the tuning inductance is connected in series with the transformer primary winding. In Fig. 14, the core is connected to the low potential end of winding P, and a carrier frequency tuning inductance $L_S$ is connected between the junction of the secondary winding sections $S_1$, $S_2$ and ground, the inductance being in series with the effective capacitance between the primary and secondary windings. The carrier set is connected across the inductance $L_S$. In Fig. 15, the low potential end of the primary P, the core and the ground terminal of the secondary winding are connected together, and to ground through inductance $L_S$. All of the transformer capacitances indicated in Fig. 1 are effective with inductance $L_S$ to define a circuit resonant to the carrier frequency. Coils $L_R$ are radio frequency chokes. In Fig. 16 each of the secondary winding sections $S_1$, $S_2$ has an inductance $L_S$, connected in series with it between its inner terminal and ground. Each inductance $L_S$ is tuned with the transformer capacitances between the primary and secondary windings and the distributed capacitance of its associated secondary winding section. The carrier set may be connected across either inductance $L_S$, or, by having the inductances $L_S$ of different values, circuits tuned to two different carrier frequencies are provided. The core is shown connected to the junction of secondary section $S_2$ and an inductance $L_S$, but may have either of the alternative connections shown by the dotted lines. The inductance $L_3$ connected between the low potential end of winding P and ground serves to isolate at carrier frequencies the primary from ground and improve the transmission and coupling (by distributed capacitance) from the primary to secondary windings.

In Fig. 17 a tuning inductance $L_C$ is connected between the core and the low potential end of winding P, a radio frequency choke $L_R$ being connected between the junction and ground. The carrier set is connected across the inductance $L_R$. In this arrangement, the effective capacitances between the transformer windings and between the windings and the core, define with the inductance $L_C$ the resonant network tuned to the carrier wave.

In Figs. 18 and 19, the primary winding is connected to ground at its low potential end, the junction of the secondary winding sections is connected to ground, and the tuning inductance $L_C$ is connected between the core and ground. In Fig. 18, the carrier telephone set is connected in parallel with the inductance $L_C$, and in Fig. 19, in series therewith. The circuit tuned to the carrier wave comprises the inductance $L_C$ and the effective capacitances between the transformer windings and between the windings and the core.

In the circuit arrangements already described, the transformer case or housing H has been connected directly to ground. In the arrangements of Figs. 20, 21 and 22, however, the transformer case as well as the core and the primary winding, or both the primary and secondary windings, are isolated from ground by the tuning inductance. This enables utilizing all of the transformer effective capacitances for tuning purposes. In Fig. 20, the low potential end of the primary winding, the core, and the junction of the secondary sections are connected together and to the case, the inductance $L_H$ being connected between the case and ground. In Figs. 21 and 22, the junction of the secondary sections is connected to ground rather than to the transformer case. In Fig. 21, the carrier telephone set is connected in series with the tuning inductance $L_H$, and in parallel with the low power frequency by-pass inductance $L_{H1}$; in Fig. 22, the carrier set is connected in parallel with the tuning inductance.

The use of the high voltage line as a part of the carrier frequency transmission path may be avoided with the arrangement of Fig. 23. A section of the neutral of the power line may be isolated for carrier transmission purposes by the networks NW, comprising suitably proportioned parallel inductance and capacity. A plurality of power consumer distribution transformers DT, of which only two are shown, would be connected between the high tension line HV and the neutral conductor N. The neutral is connected to ground through the low frequency power passing inductances $L_{10}$, the carrier frequency set being connected in parallel with the inductance $L_{10}$. Instead of an inductance, the transformer or autotransformer arrangements of Figs. 24 and 25 could be substituted in Fig. 23 between line A—A' and ground.

Instead of using the neutral alone, or the neutral and one high voltage wire, carrier telephony may be provided through the distribution transformer at the same time as electric power is furnished to a consumer over a pair of high voltage wires, i. e., a pair of phase wires, with earth return. Such an arrangement is shown in Fig. 26. The primary winding of the distribution transformer DT is connected between high voltage wires HVP, the core is connected to the junction of the secondary sections and through the tuning inductance $L_T$ to ground. The carrier telephone set is connected in parallel with the inductance $L_T$, which, with the distributed capacitances of the secondary sections and the capacitances between the primary and the core and the secondary sections, provides a network resonant at the carrier frequency. In the arrangement of Fig. 27, the core is connected to the junction of the secondary sections, and a carrier frequency choke coil $L_R$ is connected in one consumer's service wire, the tuning inductance being connected between the outer end of secondary section $S_2$ and ground, in series with carrier frequency passing condenser $C_{30}$. The tuned circuit comprises the capacitance between the primary winding and the secondary section $S_2$ and the inductance $L_T$. In the arrangement of Fig. 28, the tuning inductance is connected between the core and ground, the capacitance between the primary winding and the inductance providing the circuit tuned to the carrier frequency. The arrangement of Fig. 29 enables transmission on two different carrier waves, the inductances $L_{T1}$ and $L_{T2}$ with the capacitances between the primary and secondary windings defining the two tuned circuits.

What is claimed is:

1. In a power line carrier frequency telephone system, a power line for transmitting low frequency, high voltage electric power and, simultaneously, telephone signals on a high frequency carrier wave, said power line comprising a high voltage conductor with ground return, a subsidiary line for transmitting said low frequency electric power at a lower voltage, and a carrier frequency set, a power transformer comprising a metallic housing containing a primary winding, a secondary winding and a core on which said windings are wound, said core and one end of said primary winding being connected with said housing, the other end of said primary winding being connected to said high voltage conductor and said secondary winding being connected with said subsidiary line, and an inductive reactance connected between said housing and ground, and constituting with the distributed capacitances of said windings and between said windings, core and housing, a network tuned to said high frequency wave, the carrier telephone set being connected with said power line through said tuned network.

2. In a power line carrier frequency telephone system comprising a power line for transmitting low frequency high voltage electric power and, simultaneously, telephone signals on a high frequency carrier wave, said power line comprising a high voltage conductor with ground return, a subsidiary line for transmitting said low frequency electric power at a lower voltage and a carrier frequency set, a power transformer comprising a primary winding and a secondary winding, said secondary winding being connected with said subsidiary line, and an inductive reactance, the primary winding and said inductive reactance having a terminal in common and being connected in series between said high voltage conductor and ground, said inductive reactance and the distributed capacitance of the primary winding constituting elements in a network tuned to said high frequency carrier wave, the carrier frequency set being connected with said power line through said tuned network.

3. The combination as claimed in claim 2 in which said inductive reactance is connected between one end of said primary winding and ground.

4. In a power line carrier frequency telephone system comprising a power line for transmitting low frequency high voltage electric power and, simultaneously, telephone signals on a high frequency carrier wave, said power line comprising a high voltage conductor with ground return, a subsidiary line for transmitting said low frequency electric power at a lower voltage, and a carrier frequency set, a power transformer comprising a primary winding and a secondary winding, said secondary winding being connected with said subsidiary line, and an inductive reactance, the primary winding and said inductive reactance having a terminal in common and being connected in series between said high voltage conductor and ground, said inductive reactance and the distributed capacitance of the primary winding constituting elements in a network tuned to said high frequency carrier wave, the carrier frequency set being connected between one terminal of the inductive reactance and ground.

5. In a power line carrier frequency telephone system comprising a power line for transmitting low frequency high voltage electric power and, simultaneously, telephone signals on a high frequency carrier wave, said power line comprising a high voltage conductor with ground return, a subsidiary line for transmitting said low frequency electric power at a lower voltage, and a carrier frequency set, a power transformer comprising a primary winding, a secondary winding and a magnetic core on which said windings are wound, the primary winding being connected between said high voltage conductor and ground, and the secondary winding being connected with said subsidiary line, and an inductive reactance connected directly to said core and to said primary winding and constituting a network with the capacitances between said windings and between said windings and core, tuned to said carrier frequency wave, the telephone set being connected with the power line through said tuned network.

LELAND K. SWART.